Patented June 29, 1943

2,322,750

UNITED STATES PATENT OFFICE 2,322,750

TRISAZO DYE

Chiles E. Sparks and Joseph H. Trepagnier, Wilmington, Del., assignors to E. I. du Pont de Nemours & Company, Wilmington, Del., a corporation of Delaware No Drawing. Application August 22, 1941,
Serial No. 407,902

6 Claims. (Cl. 260—169)

This invention relates to new soluble azo dyes which are suitable for dyeing cotton, cellulosic and other similar dyeable fibers by direct dyeing methods and which produce dyed products of exceptional fastness and brightness when the dyeings are treated with formaldehyde, and especially to such azo dyestuffs which are represented by the formula X→Y→Z→C which will hereinafter be described, to processes of making such dyestuffs and to treated dyeings made therewith.

Trisazo dyestuffs are described in U. S. patent application Serial No. 360,746 which are represented in general by the formula X→Y→Z→C, wherein X is one of a limited class of primary arylamines of the benzene series, Y is one of a limited class of primary amines of the benzene and naphthalene series, Z is one of a limited class of amino-benzoylamino-naphthol sulfonic acids and C is one of a limited class of the 1,3-dihydroxy benzene series. These dyestuffs dye cellulosic fibers such as cotton and regenerated cellulose rayon directly in shades of red to brown. The dyeings are susceptible to a simple aftertreatment with formaldehyde whereby excellent washing fastness is produced and the brightness, shade and other good general properties of the direct dyeings are not materially changed.

It has now been discovered that excellent dyeings in shades of reddish violet, blue violet and blue, which shades are not attainable with the dyes of application Serial No. 360,746, are produced with dyestuffs of a class having a similar general formula, except that the Z component is a 2-(amino-phenylamino)-5-naphthol-7-sulfonic acid. The new dyes are suitable for dyeing the same classes of fibers as those of Serial No. 360,746 and their properties, except shade, are similar.

It is among the objects of the present invention to provide dyestuffs which can be applied with the simplicity of direct colors, which produce dyeings having brightness comparable with direct dyeings and superior to diazo colors, and which have washing fastness comparable to diazo colors and superior to direct colors. Another object of the invention is to provide dyestuffs having such desirable characteristics which will produce dyeings on cellulosic fibers, such as cotton, regenerated cellulose and similar dyeable fibers in shades of reddish violet to blue. Another object of the invention is to provide dyestuffs which develop improved washing fastness without material change in such shades upon being given a simple treatment with formaldehyde after having been dyed on the fiber. Still other objects of the invention will be apparent from the following description of the invention.

The objects of the invention are accomplished in general by providing azo dyes which contain at least two acid groups, one of which is sulfonic acid and the rest are carboxylic or sulfonic acid, and which are represented by the general formula X→Y→Z→C. In this general formula component X is a primary arylamine of the benzene series which is represented by the formula

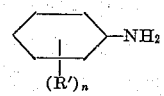

wherein R' is one or any combination of the group consisting of hydrogen, alkyl, alkoxy, sulfonic acid, carboxy and halogen; $n$ is 1 to 3 and the R' group or groups are substituted in any unoccupied position of the benzene ring.

The component Y is a primary arylamine of the benzene and naphthalene series of the group which is represented by the formulae

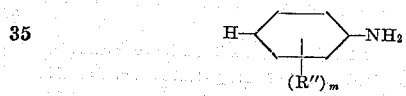

and

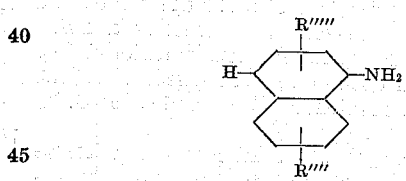

wherein H— represents the coupling position; R" is one or any combination of the group consisting of hydrogen, alkyl and alkoxy and which may be substituted in any position of the ring except the coupling or an occupied position; $m$ is 1 to 2; R'''' is hydrogen or sulfonic acid; and R''''' is hydrogen, alkyl or alkoxy.

The symbol Z stands for a 2-(amino-phenylamino)-5-naphthol-7-sulfonic acid which is represented by the formula

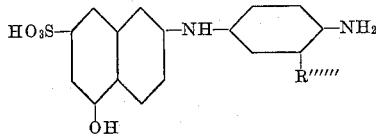

wherein R'''''' is one of the group consisting of carboxy and sulfonic acid.

The component C is a meta-dihydroxy benzene represented by the formula

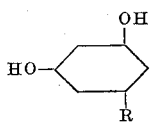

in which R is one of the group consisting of hydrogen, alkyl, alkoxy, hydroxy, amino, halogen, CN, carboxyl and sulfonic acid.

In the foregoing formula the terms alkyl and alkoxy refer to groups having one to six carbon atoms and halogen refers to any of the halogens except iodine.

The invention will be more fully set forth in the following more detailed description which includes examples that are given as illustrative embodiments of the invention and not as limitations thereof. Parts are expressed in parts by weight unless otherwise noted.

*Example 1*

A solution was made by dissolving 331 parts of the sodium salt of 4-amino-3-methoxy-azo-benzene-3'-sulfonic acid in 6000 parts of water and heating to 50°–55° C. A 30% solution containing 70 parts of 100% sodium nitrite was well mixed into the solution, and the mixture was acidified by adding it slowly to an acid solution containing 91 parts of 100% hydrochloric acid in 500 parts of water which had been previously warmed to 45° C. The resulting mixture was maintained at a temperature of 45–50° C. and with the same excess of nitrite for approximately 20 minutes and then cooled to 25° C. by adding cracked ice.

To a slurry containing 410 parts of 2-(4'-amino-3'-sulpho-phenylamino)-5-naphthol-7-sulfonic acid) in 5000 parts of water, 200 parts of sodium carbonate were added to dissolve the solids, and thereby leaving the solution distinctly alkaline to Brilliant Yellow paper. An additional 265 parts of sodium carbonate were dissolved in the solution, and the solution was cooled to 0° C. by adding ice.

The diazo was slowly added to the alkaline solution of the coupling component while maintaining a temperature of 5°–10° C. and an excess of 2-(4'-amino-3'-sulphophenylamino)-5-naphthol-7-sulfonic acid. The suspension was maintained alkaline to Brilliant Yellow paper and stirred for about one hour after the addition of the diazo. Finally, the mixture was heated to 70°–80° C., salted to approximately 15% with sodium chloride and filtered.

The filter cake was mixed with approximately 4000 parts of water until a smooth slurry was obtained. The slurry was cooled to 10°–15° C. by adding ice and then a 30% solution of hydrochloric acid containing approximately 150 parts of 100% hydrochloric acid was added.

A 30% solution containing 75 parts of 100% sodium nitrite was added to the slurry and diazotization was carried out at 10°–15° C. for about one hour whilst maintaining a distinct excess of nitrite.

A solution was made by stirring 132 parts of 1,3-dihydroxy benzene into 2000 parts of water. The solution was iced to 0° C. and 225 parts of sodium carbonate were added.

The diazo was slowly added to the alkaline solution of 1,3-dihydroxy benzene. An excess of 1,3-dihydroxy benzene and an alkalinity to Brilliant Yellow were maintained. The suspension was stirred one hour after the addition of the diazo, heated to 70°–80° C., salted to 18% with sodium chloride, filtered and dried at 70°–80° C. The dry powder had a blue-black appearance and is represented by the formula

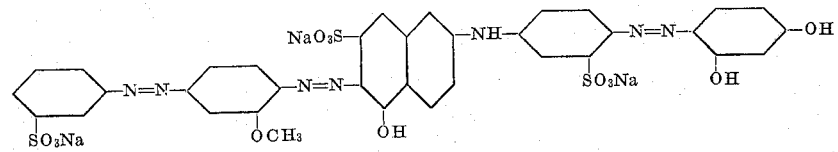

A dyebath was made by dissolving 0.2 gram of the above described product in 50 cc. of water at 190°–200° F., adding 0.4 gram of sodium carbonate to assist the solution, diluting with water and stirring to a total volume of 500 cc., the water being at approximately 160° F. and then adding 40 cc. of a 10% solution of Glauber's salt. A 10 gram piece of regenerated cellulose rayon was wet out with water, squeezed partially dry and entered into the dyebath. The temperature of the dyebath was raised to 180°–190° F. in the course of fifteen minutes and the piece was held in the dyebath at that temperature for one hour with stirring at frequent intervals. At the end of one hour, the dyeing was removed and rinsed in cold water.

The rinsed dyeing from the above operation was entered into 500 cc. of water at 130°–140° F. Then approximately 10 cc. of a 10% formaldehyde (25 cc. of approximately 37% formaldehyde by weight diluted to 250 cc. with water) were added. The bath was held at this temperature for twenty minutes and the dyeing was removed, rinsed and dried.

A preferred formaldehyde after treatment because of its ease of application is carried out at the end of the dyeing period by adding 10 cc. of 10% formaldehyde to the dyebath. After about twenty minutes' treatment at bath temperature, the dyeings are removed, rinsed and dried. In both cases the dyeing was a bright blue violet shade having good washing and light fastness and good discharge properties.

A trisazo dye which was similar except that the Z component was a 2-(amino-benzoylamino)-5-naphthol-7-sulfonic acid instead of a 2-(aminophenylamino)-5-naphthol-7-sulfonic acid, gave a rubine dyeing on regenerated cellulose rayon.

Example 2

A product represented by the formula

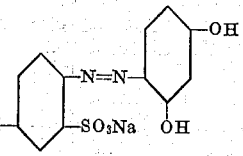
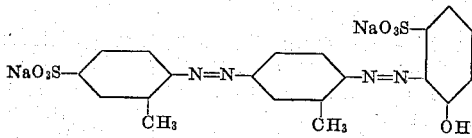

was prepared by the same procedure as that described in Example 1 except that 328 parts of amino-azo-toluene sodium sulfonate were used instead of 331 parts of the sodium salt of 4-amino-3-methoxy-azo-benzene-3'-sulfonic acid.

The product was a dark powder which dyed regenerated cellulose rayon. When aftertreated as described in Example 1, the dyeing was a violet shade which had excellent washing fastness.

Example 3

A product represented by the formula

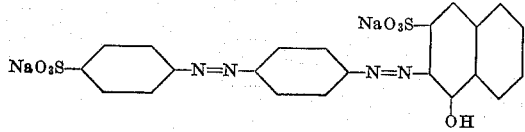
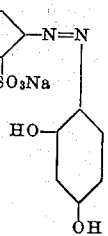

was prepared by the procedure described in Example 1 by using 321 parts of amino-azo-benzene sodium sulfonate instead of 331 parts of 4-amino-3-methoxy-azo-benzene-3'-sulfonic acid.

The product was a dark powder which, when dyed on regenerated cellulose rayon and aftertreated as described in Example 1, yielded dyeings of a reddish violet shade which were fast to washing.

The following are additional illustrations of the invention which have superior properties which are similar to those of the foregoing examples. The components of the dyes and the shades of the aftertreated dyeings on regenerated cellulose rayon are listed. The dyeings made with these dyes were bright shades. They had good light and washing fastness, and good discharge properties.

Any of the compounds represented by the general formula can be used as the X component, such as 2-amino-benzene-sulfonic acid, 4-chloro-aniline, 5-chloro-2-amino-toluene, 2-methoxy-aniline, 4-methoxy-aniline, 2-methoxy-5-methyl-aniline, 4-amino-benzoic, 3-amino-4-chloro-benzene-sulfonic acid, 2-chloro-5-amino-benzene-sulfonic acid, 2-amino-3,5-dimethoxy-benzene-sulfonic acid, 2-amino-5-methoxy-benzene-sulfonic acid, 2-methyl-4-amino-benzene-sulfonic acid, 2-n-butoxy-3-bromo-aniline, 2-bromo-4-n-hexyl-aniline, 4-fluoro-aniline and 2-ethyl-4-n-propoxy-aniline.

Other illustrations of Y components which give the above described results are 2,5-diethoxy-aniline, 1-amino-naphthalene-7-sulfonic acid, 1-amino-naphthalene-8-sulfonic acid, 1-amino-2-methoxy-naphthalene-6-sulfonic acid and 1-amino-naphthalene.

Another Z component which can be used instead of the one shown in the examples and which gives similar satisfactory results is 2-[4'-amino-3'-carboxy-phenylamino]-5-naphthol-7-sulfonic acid but the dyes made with 2-(4'-amino-3'-carboxy-phenylamino)-5-naphthol-7-sulfonic acid are preferred.

A variety of C components can be used satisfactorily with similar results, such as 3,5-dihydroxy-methoxy-benzene, 3,5-dihydroxy-cyano-benzene, 3,5-dihydroxy-chloro-benzene, 3,5-dihydroxy-fluoro-benzene, 3,5-dihydroxy-bromo-benzene, 3,5-dihydroxy-aniline, 3,5-dihydroxy-

| Example | X component | Y component | Z component | C component | Shade of formaldehyde aftertreated dyeing |
|---|---|---|---|---|---|
| 4 | 2-chloro-5-amino-toluene-4-sulfonic acid. | 2-methoxy-5-methyl-aniline. | 2-(4'-amino-3'-sulpho-phenylamino)-5-naphthol-7-sulfonic acid. | 1,3-dihydroxy-benzene | Blue. |
| 5 | 3-amino-benzene sulfonic acid. | 1-amino-naphthalene-6-sulfonic acid. | do | do | Do. |
| 6 | Aniline | Aniline | do | do | Reddish violet. |
| 7 | 2-methoxy-5-methyl-aniline | 2-methoxy-5-methyl-aniline. | do | do | Blue. |
| 8 | 2-naphthylamine-4,8-disulfonic acid. | 2,5-dimethoxy-aniline | do | do | Do. |
| 9 | do | 2-methoxy-5-methyl aniline. | do | do | Do. |
| 10 | 2-naphthylamine-6,8-disulfonic acid. | do | do | do | Do. |
| 11 | do | 2,5-dimethoxy-aniline | do | do | Do. |
| 12 | Metanilic acid | 2-methoxy-aniline | do | 1,3,5-trihydroxy-benzene | Blue violet. |
| 13 | do | do | do | 1-methyl-3,5-dihydroxy-benzene. | Do. |
| 14 | 2-methoxy-5-methyl-aniline | 2-methoxy-5-methyl-aniline. | 2-(4'-amino-3'-sulpho-phenylamino)-5-methyl-7-sulfonic acid. | 1,3-dihydroxy-benzene | Blue. | benzene-sulfonic acid and 3,5-dihydroxy-n-hexoxy-benzene.

Dyeings in deeper shades and with better light fastness are produced by aftertreating the dyeings with copper salts. The after-coppering operation may be carried out on the direct dyeing in a fresh bath or in the dye bath by procedures similar to those outlined above for the aftertreatment with formaldehyde except that 10 cc. of a 5% solution of hydrated cupric sulfate is used instead of 10 cc. of formaldehyde solution. In either case, the operation is allowed to continue for about twenty minutes, or until a copper complex is formed, at the end of which time the treated dyeings are removed, rinsed and dried.

A further alternative procedure has been found to give a marked improvement in fastness properties both to light and to washing. This consists in a combination of the formaldehyde and after-coppering treatment. The double aftertreatment may be done either in the dye bath or in a fresh bath as described in Example 1. It may be carried out by first treating with formaldehyde solution until a formaldehyde complex is formed and then treating with the copper sulfate solution.

Other metal salts can be used instead of water-soluble copper salts to give similar improvements, such as the water-soluble salts of the various metals which have atomic weights between 50 and 65.

The washing fastness of the formaldehyde treated dyeings made with the compounds of the invention are equal to and in some cases superior to dyeings made with the diazo colors. In use the compounds of the invention are advantageous to the dyer as compared to the use of the diazo colors in that equal fastness can be obtained with considerably less effort and expense for materials. The diazo colors must be azotized and developed in order to obtain the desired washing fastness, thus requiring the use of three baths. In operating the dyes of the invention, excellent results may be obtained by using only one bath. Considerable shade change occurs during the development of diazo colors, whereas the aftertreatment of the dyes of the invention with formaldehyde produces practically no shade change.

From the foregoing disclosure it will be recognized that the invention is susceptible of modification without departing from the spirit and scope thereof and it is to be understood that the invention is not restricted to the specific illustrations thereof herein set forth.

We claim:

1. A trisazo dye which in the form of its acid is represented by the formula X→Y→Z→C in which X is one of a group represented by the formula

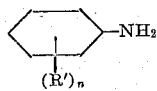

wherein R' is from a group consisting of hydrogen, alkyl, alkoxy, sulfonic acid, carboxy, bromine, chlorine and fluorine; and $n$ is an integer not greater than 3; Y is one of a group represented by the formulae

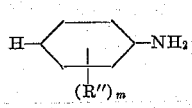

and

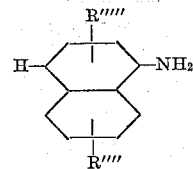

wherein H—represents the coupling position; R'' is from a group consisting of hydrogen, alkyl and alkoxy; $m$ is an integer not greater than 2; R'''' is one of a group consisting of hydrogen and sulfonic acid; and R''''' is one of a group consisting of hydrogen, alkyl and alkoxy; and Z is one of a group represented by the formula

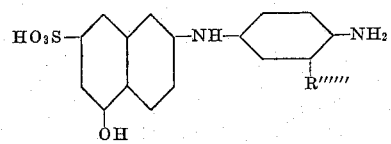

wherein R'''''' is one of a group consisting of carboxylic and sulfonic acid; and C is one of a group represented by the formula

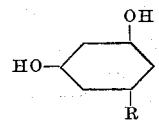

wherein R is one of a group consisting of hydrogen, amino, bromine, chlorine, fluorine, —CN, carboxylic and sulfonic acid; said compound containing at least two acid groups, at least one of which is sulfonic acid.

2. The trisazo dye which in the form of its acid is represented by the formula

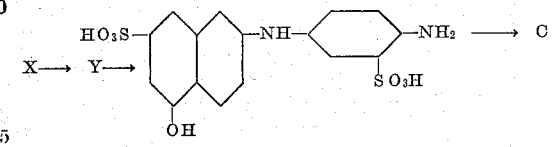

in which X is one of a group represented by the formula

wherein R' is from a group consisting of hydrogen, alkyl, alkoxy, sulfonic acid, carboxy, bromine, chlorine and fluorine; and $n$ is an integer not greater than 3; Y is one of a group represented by the formulae

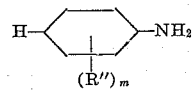

and

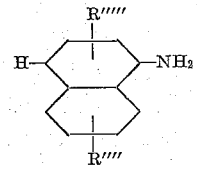

wherein H— represents the coupling position; R'' is from a group consisting of hydrogen, alkyl and alkoxy; $m$ is an integer not greater than 2; R'''' is one of a group consisting of hydrogen and sulfonic acid; and R''''' is one of a group consisting of hydrogen, alkyl and alkoxy; and C is one of a group represented by the formula

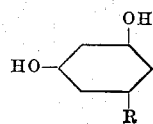

wherein R is one of a group consisting of hydrogen, amino, bromine, chlorine, fluorine, —CN, carboxylic and sulfonic acid; said compound containing at least two acid groups, at least one of which is sulfonic acid.

3. The trisazo dye which in the form of its acid is represented by the formula

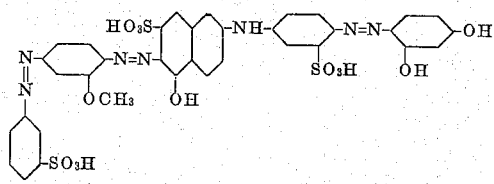

4. The trisazo dye which in the form of its acid is represented by the formula

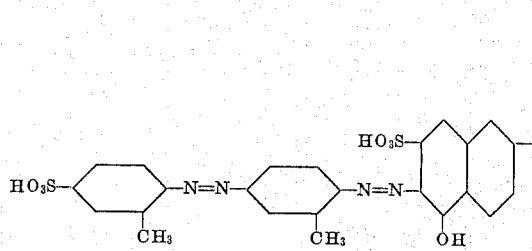

5. The trisazo dye which in the form of its acid is represented by the formula

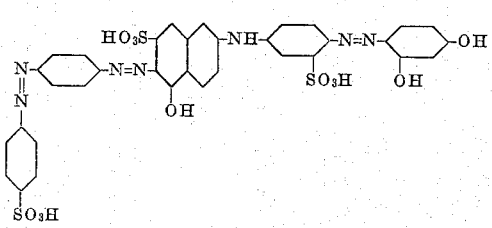

6. The process which comprises diazotizing a compound represented by the formula

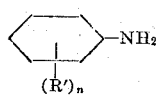

wherein R' is from a group consisting of hydrogen, alkyl, alkoxy, sulfonic acid, carboxy, bromine, chlorine and fluorine and $n$ is an integer not greater than 3; coupling with a mono-amino compound of a group consisting of compounds of the benzene and naphthalene series which are represented by the formulae

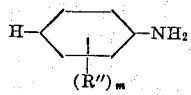

and

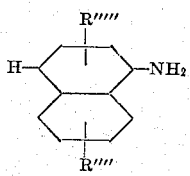

wherein H— represents the coupling position, $R''$ is from a group consisting of hydrogen, alkyl and alkoxy, $m$ is an integer not greater than 2, $R''''$ is one of a group consisting of hydrogen and sulfonic acid and $R'''''$ is one of a group consisting of hydrogen, alkyl and alkoxy; diazotizing the resulting monazo compound and coupling with

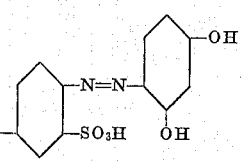

an amino-phenylamino-naphthol sulfonic acid which is represented by the formula

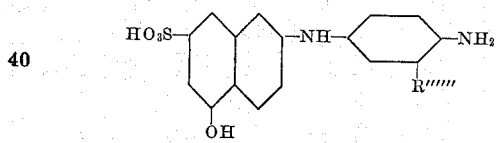

wherein $R''''''$ is one of a group consisting of carboxylic acid and sulfonic acid; diazotizing the resulting disazo compound and coupling with a 1,3-dihydroxy benzene which is represented by the formula

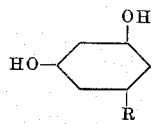

wherein R is one of a group consisting of hydrogen, amino, bromine, chlorine, fluorine, —CN, carboxylic and sulfonic acid; said components being selected so that at least one component contains a sulfonic acid group and at least one other acid group is contained in the product.

CHILES E. SPARKS.
JOSEPH H. TREPAGNIER.